United States Patent [19]

Pierce et al.

[11] 3,714,275

[45] Jan. 30, 1973

[54] MONOCHLOROTETRAFLUOROBENZENE COMPOUNDS

[75] Inventors: Ogden R. Pierce; John R. Greenwald, both of Midland, Mich.

[73] Assignee: Dow Corning Corporation, Midland, Mich.

[22] Filed: Aug. 27, 1970

[21] Appl. No.: 67,616

[52] U.S. Cl. ............... 260/650 F, 117/105, 117/127, 117/147, 260/82.1, 260/91.5
[51] Int. Cl. ............................................. C07c 25/24
[58] Field of Search ................................. 260/650 F

[56] References Cited

UNITED STATES PATENTS

| | | | |
|---|---|---|---|
| 3,046,313 | 7/1962 | Pummer et al. | 260/650 F |
| 3,412,162 | 11/1968 | Musgrave | 260/650 F |
| 3,511,883 | 5/1970 | Bergomi | 260/650 F |

*Primary Examiner*—Howard T. Mars
*Attorney*—Robert F. Fleming, Jr., Laurence R. Hobey, Harry D. Dingman, Howard W. Hermann and Norman E. Lewis

[57] ABSTRACT

3-Chloro-2,4,5,6-tetrafluoro-$\beta$-hydroxyethylbenzene is a precursor to 3-chlorotetrafluorostyrene which can be homopolymerized or copolymerized with styrene to obtain coating compositions.

1 Claim, No Drawings

MONOCHLOROTETRAFLUOROBENZENE COMPOUNDS

The invention herein described was made in the course of, or under, a contract or subcontract thereunder with the United States Air Force.

This invention relates to functional monochlorotetrafluorobenzene compounds. In one aspect, the invention is directed to 3-chlorotetrafluorostyrene. In another aspect, the invention relates to vinyl polymers containing pendent chlorotetrafluorophenyl substituents.

In accordance with the invention there are provided compounds of the general formula

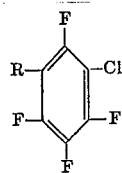

in which R is a —CH$_2$CH$_2$OH or —CH=CH$_2$ radical.

As shown in the examples, 3-chloro-2,4,5,6-tetrafluoro-β-hydroxyethylbenzene is prepared by reacting the Grignard reagent with ethylene oxide, the Grignard reagent being prepared from 1,3-dichloro-2,4,5,6-tetrafluorobenzene. The hydroxyethyl functionality can be subjected to further reactions such as esterification to obtain a variety of useful compounds.

One such reaction is dehydration of the β-hydroxyethyl compound with phosporous pentoxide to obtain 1-vinyl-3-chloro-2,4,5,6-tetrafluorobenzene (3-chlorotetrafluorostyrene). This styrene monomer can be polymerized under the influence of ultraviolet light or free-radical catalysts, such as peroxides, to obtain vinyl-type addition polymers. Thus, the invention also provides vinyl polymers containing at least one unit of the formula

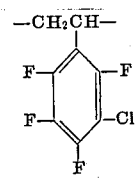

The polymers can be homopolymers in which essentially all of the units are of the above-described formula or they can be copolymers formed by polymerization with other vinyl monomers such as styrene, acrylonitrile and butadiene. The fluorinated polystyrene is a hard rigid polymer and can be molded or applied as a protective coating to various substrates, such as metal or wood. When copolymerized with butadiene, an elastomer having a high fluorine content is obtained. A rubbery polymer of 25 mol percent

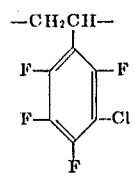

and 75 mol percent

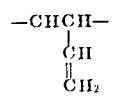

units will have better solvent resistance than its non-fluorinated SBR analog.

The following examples are illustrative and not to be construed as limiting of the invention which is delineated in the claims.

EXAMPLE 1

A Grignard reaction was initiated by adding approximately 0.5 ml. of methyl iodide to 12.5 grams of magnesium in 150 ml. of tetra hydrofuran. 1,3-Chloro-2,4,5,6-tetrafluorobenzene (55 grams in 200 ml. of ether) was added at such a rate as to maintain the Grignard reaction temperature below 35°C. After the addition was complete, 150 mls. of ether and 200 mls. of tetrahydrofuran and the mixture was stirred overnight. The Grignard reagent was cooled and ethylene oxide was added in incremental amounts. After 25 grams of ethylene oxide had been added, the reaction mixture was stirred for about 16 hours. Dilute hydrochloric acid (200 mls.) was added to the reaction mixture and the organic and aqueous phases were separated. The ether layer was washed with water and concentrated by distillation of the solvent. The residue was fractionated under reduced pressure to yield 23.5 grams of 3-chloro-2,4,5,6-tetrafluoro-β-hydroxyethylbenzene with a boiling point of 76°–79°C./1 mm Hg.

Analysis: Calculated for C$_8$H$_5$ClF$_4$O; C, 42.0; H, 2.18; F, 33.2
Found: C, 42.2; H, 2.36; F, 33.4.

EXAMPLE 2

3-Chloro-2,4,5,6-tetrafluoro-β-hydroxyethylbenzene (135 grams) was added to 160 grams of P$_2$O$_5$ and the mixture was heated to 160°C. Hydroquinine was added. The volatile material was removed under vacuum and fractionated to obtain 52.7 grams of 3-chloro-2,4,5,6-tetrafluorostyrene which had a boiling point of 73°–75 °C./20 mm Hg. The proposed structure was confirmed by mass spectral and n.m.r. data.

EXAMPLE 3

Six grams of 3-chlorotetrafluorostyrene was placed in a test and a few crystals of 2,2' azobis(2-methyl propionitrile) were added. The mixture was heated for 3 hours at 132°C. The solid polymer was removed by breaking the test tube. The polymer was soluble in acetone and methylene chloride. It was softened by, but not soluble in benzene. A solution (approximately 20 percent solids in methylene chloride) of the polymer was coated onto an aluminum panel and dried to obtain a 6 mil thickness. The coating adhered strongly to the metal and had a pencil hardness of F. An unsupported film of the polymer had self-extinguishing characteristics when exposed to an open flame.

EXAMPLE 4

A mixture of 2 grams of styrene, 4 grams of 3-chlorotetrafluorostyrene and a few crystals of 2,2'-azobis-(2-methyl propionitrile) was heated in a test tube for 16 hours at 132°C. A solid polymer was obtained. A portion of the polymer was dissolved in benzene and the solution applied to an aluminum panel. After drying the film adhered strongly to the panel and had a pencil hardness of F.

Reasonable modification and variation are within the scope of the present invention which is directed to monochlorotetrafluorobenzene compounds and vinylic polymers prepared therefrom.

That which is claimed is:
1. A compound of the formula

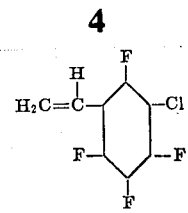

* * * * *